US011016166B1

(12) United States Patent
Semper et al.

(10) Patent No.: US 11,016,166 B1
(45) Date of Patent: May 25, 2021

(54) ULTRA-COMPACT STAR SCANNER

(71) Applicant: United States of America as represented by the Administrator of NASA, Washington, DC (US)

(72) Inventors: Sean R. Semper, Greenbelt, MD (US); Andrew Salamon, Greenbelt, MD (US); Garrett J. West, Greenbelt, MD (US); Kenneth Deily, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 306 days.

(21) Appl. No.: 16/144,159

(22) Filed: Sep. 27, 2018

(51) Int. Cl.
*G01S 3/781* (2006.01)
*G02B 3/00* (2006.01)
*G01C 21/02* (2006.01)
*G01C 21/24* (2006.01)
*G01S 3/786* (2006.01)

(52) U.S. Cl.
CPC .......... *G01S 3/7867* (2013.01); *G01C 21/025* (2013.01); *G01C 21/24* (2013.01); *G02B 3/0075* (2013.01); *G02B 2003/0093* (2013.01)

(58) Field of Classification Search
CPC ...... G01S 3/7867; G01S 3/7861; G01S 3/781; G02B 2003/0093; G02B 3/00; G02B 3/0075; G01C 21/025; G01C 21/02; G01C 21/24
See application file for complete search history.

(56) References Cited

U.S. PATENT DOCUMENTS

| | | | | |
|---|---|---|---|---|
| 3,388,629 A * | 6/1968 | Brenholdt | ............... | G01S 3/787 356/147 |
| 4,740,681 A * | 4/1988 | Tsuno | ..................... | G01S 3/789 250/203.6 |
| 5,223,702 A * | 6/1993 | Conley | ..................... | B64G 1/36 250/203.6 |
| 6,917,025 B1 * | 7/2005 | Diehl | ..................... | B64G 1/361 250/203.3 |
| 8,169,623 B2 * | 5/2012 | McComas | ............... | G01C 21/02 356/614 |
| 10,641,859 B2 * | 5/2020 | Laine | ..................... | G01S 3/7867 |
| 10,657,371 B1 * | 5/2020 | Thompson | ............... | G06T 7/246 |
| 2003/0006345 A1 * | 1/2003 | Guo | ........................ | B64G 1/366 244/168 |
| 2005/0027407 A1 * | 2/2005 | Holt | ........................ | B64G 1/26 701/4 |
| 2010/0208244 A1 * | 8/2010 | Earhart | ................. | G01S 3/7867 356/139.01 |
| 2016/0282441 A1 * | 9/2016 | Laine | ....................... | G01B 9/06 |
| 2017/0219350 A1 * | 8/2017 | Hindman | ............... | B64G 1/361 |
| 2019/0023422 A1 * | 1/2019 | Nicholson | ............ | B64G 1/1078 |
| 2019/0033421 A1 * | 1/2019 | Laine | ..................... | G01S 3/7867 |
| 2019/0155007 A1 * | 5/2019 | Steever | ................. | G02B 17/086 |
| 2020/0010221 A1 * | 1/2020 | Fraze | ....................... | B64G 1/44 |
| 2020/0039665 A1 * | 2/2020 | Vaujour | ............. | H04B 7/18519 |

* cited by examiner

*Primary Examiner* — John R Lee
(74) *Attorney, Agent, or Firm* — Matthew F. Johnston; Bryan A. Geurts; Helen M. Galus

(57) ABSTRACT

A star scanner is provided that uses miniaturized high-speed electronics and an ultra-compact freeform optical design. The star scanner reduces instrument volume, reduces power consumption, and reduces costs, relative to existing star scanners. The optics can be used with a credit card-like footprint, electronics sensor board with optimally packed electronics.

12 Claims, 11 Drawing Sheets

| | |
|---|---|
| FFOV (full field of view) | 8 degrees |
| Slit Width FOV | 34.34124 arcmin |
| EPD | 15 mm |
| Detector | 1 pixel |
| Pixel Height | 2.8 mm |
| Slit Width | 0.2 mm |
| lambda min | 450 nm |
| lambda max | 600 nm |
| lambda ref | 550 nm |
| EFL of Telephoto | 20.02093 mm |
| F/# | 1.334729 |
| NA | 0.374608 |
| | |
| Slit Width | 200.005 um |
| Diffraction Spot Size | 1.791206 um |
| | |
| | |
| EPD Area | 176.7146 mm^2 |
| EP X | 17.67146 mm' |
| EP Y | 10 mm |
| F/# X | 1.132953 |
| F/# Y | 2.002093 |

ULTRA-COMPACT STAR SCANNER

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

FIELD OF THE INVENTION

The present invention relates to developing a novel star scanner sensor prototype for integrated CubeSat structures that desire streamlined Guidance, Navigation and Control (GN&C) components.

BACKGROUND OF THE INVENTION

Star scanners are typically bulky, heavy components. The optics used in conventional star scanners are expensive and difficult to manufacture. Due to the bulky nature of existing star scanners, that have not been made interchangeable with other spacecraft components. A need exists for a compact, inexpensive star scanner that can be made in a modular form, that is swappable with existing spacecraft modular components, and that can be used as a modular component in a variety of different spacecrafts.

SUMMARY OF THE INVENTION

The present invention provides an optical system for miniaturized spacecraft including CubeS at and NanoSat spacecraft and fulfills the demand for an optical system that fits within volume-constrained packages. The optical system can be formed by using newly emerging freeform optics to create card slot-able instruments and sensors for modular spacecraft design.

The present invention provides an optical sensor for star scanning, which can be used in CubeSat platforms including 1U CubeSat platforms for which existing star scanner optical systems are too large. The star scanner can be used for measuring electromagnetic radiation from stars, planets, other celestial objects, and the like, as they transit within the scanner's field of view, with unprecedented spatiotemporal accuracy. Such accuracy requires 10 arcmin or better pointing knowledge and can be easily achieved by the present invention.

The freeform optical sensor of the present invention can be integrated into existing CubeSat structures and traditional configurations. The sensor can be configured as a card designed to slide into a standard frame and can be easily swapped with other components. Such modularity significantly reduces CubeSat development time and costs and improves integration.

BRIEF DESCRIPTION OF THE DRAWINGS

The present invention can be even more fully understood with the reference to the accompanying drawings which are intended to illustrate, not limit, the present invention.

FIG. 3 is a table showing the optical design specifications of a star scanner incorporating the freeform optic of FIGS. 1 and 2, in accordance with various embodiments of the present invention.

DETAILED DESCRIPTION OF THE INVENTION

Figure 1:
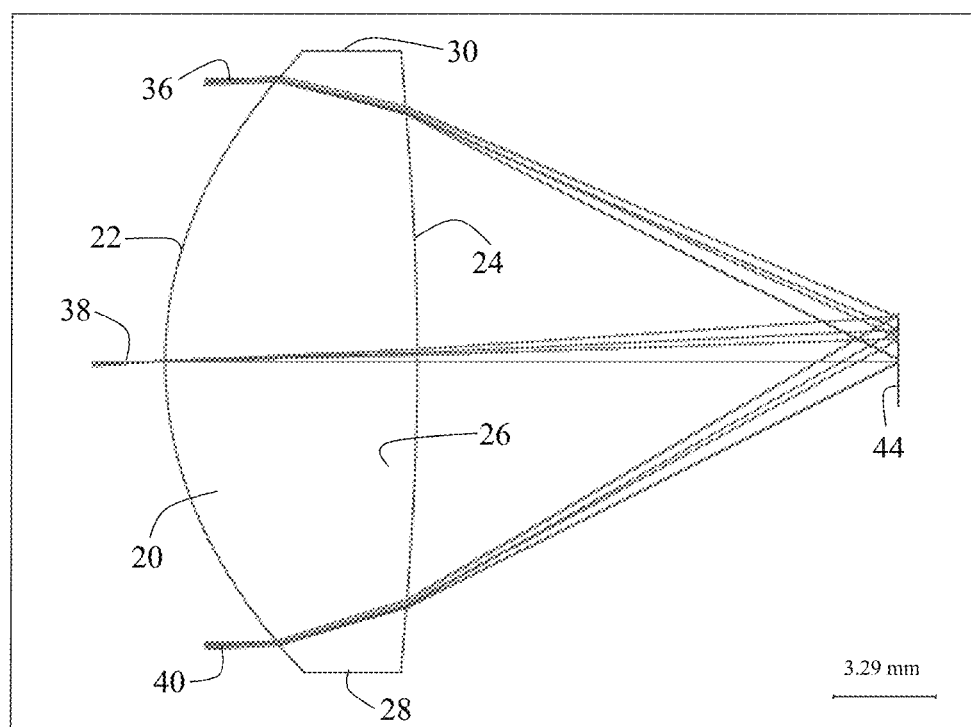
FIG. 1 is a top view of a freeform optic and showing incident light beams radiating therethrough, being spectrally separated, and impinging on an image plane, in accordance with various embodiments of the present invention.

The present invention provides not only a star scanner, but a freeform optic shaped to have: a convex front surface having a first radius of curvature, from left to right; and a convex back surface having a second radius of curvature, from left to right, wherein the second radius of curvature is greater than the first radius of curvature. The freeform optic can also have: a planar right surface; a planar left surface that is parallel to the planar right surface; a planar top surface; and a planar bottom surface that is parallel to the planar top surface. The freeform optic can have a width, measured from the left surface to the right surface, of one inch or less. The freeform optic can have a height, from the top surface to the bottom surface, that is less than the width. The freeform optic can comprise a glass or plastic material, for example, fused silica glass or a 3D-printed plastic material. The top surface can be provided with a protrusion extending therefrom, and a top shoulder along a sidewall of the protrusion and extending from an intersection of the protrusion and the top surface. The protrusion can be useful for aligning the freeform optic in a housing.

The present invention also provides an optical component comprising a freeform optic as described herein, and an optic housing, wherein the optic housing is configured to secure the freeform optic therein. The optic housing can have a front opening through which incoming beams of radiation can enter the housing and reach the freeform optic, and a back opening through which beams of radiation can exit the housing. The optic housing can align the freeform optic such that the freeform optic can focus incoming beams of radiation as the beams pass through, or after the beams pass through, the freeform optic, for example, as the beams exit the back opening of the housing. The back opening of the housing can be aligned with or on an image or focal plane. The optic housing can have a first housing portion having a first circumference, a second housing porting having a second circumference that is greater than the first circumference, and a shoulder formed at an intersection of the first housing portion and the second housing portion. The shoulder can be useful for securing and aligning the optic housing in a frame or chassis.

The star scanner of the present invention can comprise an optical component as described herein, and a detector. The detector can comprise a receptive surface and can be aligned with the optic housing such that incoming beams of radiation pass through the front opening of the housing, pass through and are refracted by the freeform optic to form focused beams of radiation, and exit the back opening of the housing. As or after the focused beams reach or pass through the back opening, they can impinge upon the receptive surface of the detector, for example, at or on an image or focal plane. The detector can be a camera. The receptive surface can comprise an array of pixels. The detector can comprise silicon photomultipliers. At or near the image or focal plane, the star scanner can further comprise a reticle, for example, a V-slit reticle. The reticle can be positioned between the back opening of the optic housing and the receptive surface of the detector. The star scanner can further comprise a module frame or chassis and the module frame can hold the optical component, the V-slit reticle, and the detector, aligned with one another. The star scanner can further comprise an electronics sensor board mounted in or on the module frame, for example, aligned with and mounted with the detector.

The electronics sensor board can comprise electrical leads for receiving signals generated by the detector, a charge sensitive amplifier, a shaping amplifier, and an analog-to-digital convertor. The charge sensitive amplifier can have a maximum area of 1 square inch or less and the shaping amplifier can have a maximum area of 1 square inch or less. The star scanner can further comprise a digital signal processor in electrical communication with, and configured to receive digital signals from, the analog-to-digital convertor. The digital signal processor can have a maximum area of 100 cm$^2$ or less, for example, a 10 cm×10 cm footprint. The digital signal processor can be mounted in or on the module frame or can be separate from the module frame.

The present invention also provides a spacecraft comprising a module slot configured to accommodate the module frame of the star scanner. The star scanner can be mounted in the spacecraft such that the module frame is received within the module slot. The modularity of the star scanner enables the star scanner to be swapped out or exchanged with other modular components. For example, a system can be provided that comprises a star scanner as described herein, an analytical instrument module, and a spacecraft. The analytical instrument can be different than the star scanner and can comprise an instrument module frame of about the same overall dimensions as the star scanner module frame. The analytical instrument can be configured to carry out one or more analyses from the spacecraft. The spacecraft can comprise a module slot configured to accommodate and mount a plurality of different modular components including, independently, each of the analytical instrument and the star scanner. The module slot can configured to receive the instrument module frame or the star scanner module frame, one at a time. The system can be configured to enable swapping of the star scanner and the analytical instrument.

The system including a spacecraft having a module slot can further comprise a pin and socket connector system, wherein the module slot comprises at least one of a pin or a socket and each of the analytical instrument and the star scanner comprises at least one of a pin or a socket. Wiring harnesses can instead or additionally be used.

In some embodiments, a system is provided that comprise two or more spacecrafts and a star scanner as described herein. Each of the spacecrafts can comprise a respective module slot configured to receive the module frame of the star scanner. The star scanner can be configured to be (1) inserted into the module slot of a first of the two or more spacecrafts, (2) removed therefrom, and (3) subsequently inserted into the module slot of a second of the two or more spacecrafts.

With reference to the drawings, FIG. 1 is a top view of a freeform optic 20 according to various embodiments of the present invention. Freeform optic 20 has a convex front surface 22, a relatively less convex back surface 24, a planar top surface 26, a planar right surface 28, a planar left surface 30, and a planar bottom surface 32. As can be seen from the top view in FIG. 1, back surface 24 bows outwardly slightly, whereas front surface 22 bows more predominantly outwardly. The full field of view (FFOV) of freeform optic 20 is eight (8) degrees in the embodiment shown. The full field of view can be any suitable arc size, however, for example, from 1° to about 100°, from 2° to about 50°, from 3° to about 30°, from 5° to about 20°, or from 6° to about 12°. Herein, the modifier "about" connotes a deviation of plus or minus 5 percent.

Figure 2:
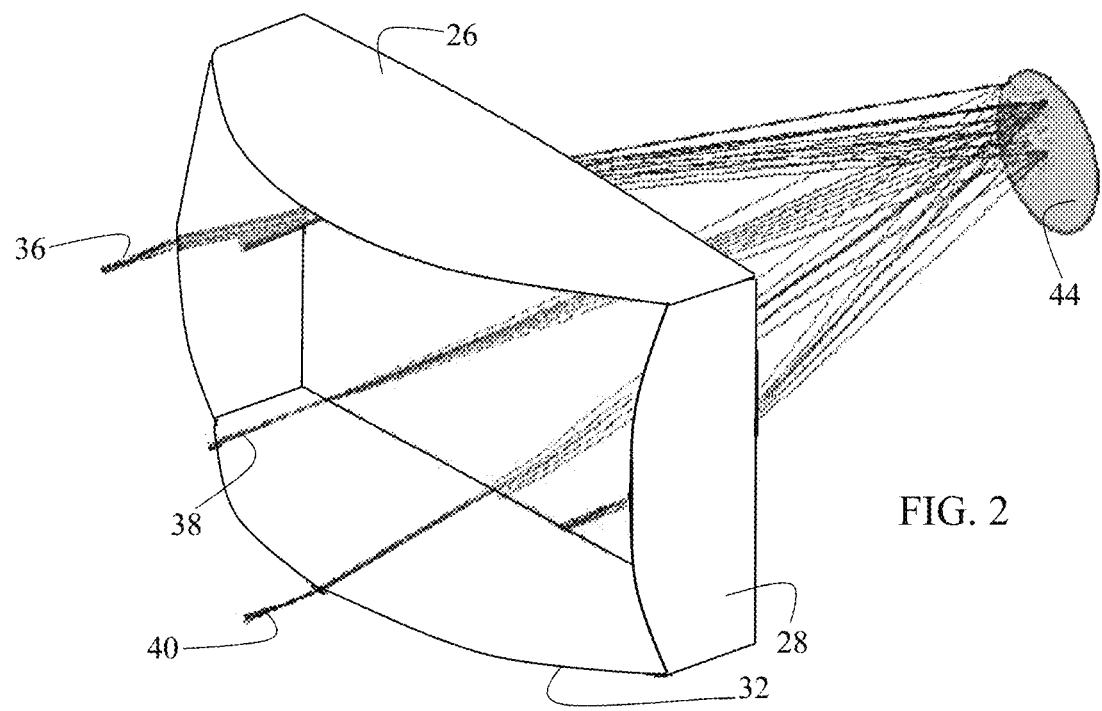
FIG. 2 is a top right front perspective view of the freeform optic shown in FIG. 1.

Front surface 22 of freeform optic 20 can not only be bowed outwardly from left to right but can also bow outwardly from top to bottom. As shown in FIG. 2, from the profile of right-side 28, it can be seen that front face 22 of freeform optic 20 flows outwardly and the optic is thicker along a midsection between the top and bottom surfaces of the freeform optic. Freeform optic 20 can have a width, measured from right side 28 to left side 30, of, for example, less than or equal to about one inch, about 19.3 mm, or from 1.9 cm to 2.0 cm. Front surface 22 of freeform optic 20 can bow outwardly from left to right at a radius of curvature of from 10.0 mm to 100.0 mm, for example, of from 40.0 mm to 60.0 mm, of from 50.0 mm to 55.0 mm, or of about 52 mm. For manufacturing, the front surface can be made of a convex shape having a radius of curvature value of −51.98845 with a tolerance of −2.08 mm.

Rear surface 24 of freeform optic 20 can bow outwardly from left to right at a radius of curvature that would be negative relative to the radius of curvature of front surface 22, as both surfaces are convex, but rear surface 24 of freeform optic 20 would have a radius of curvature having an absolute value of from 50.0 mm to 110.0 mm, for example, of from 70.0 mm to 90.0 mm, of from 80.0 mm to 85.0 mm, or of about 81.5 mm. For manufacturing, the rear surface can be made of a convex shape having a radius of curvature value of 81.51861 mm with a tolerance of 3.26 mm.

FIG. 3 provides details of the specification of an exemplary optical design according to the present invention. In addition to the specifics shown in FIG. 3, The different XY polynomial values can include an $X^2$ value which equals to 4.080E-02, a $Y^2$ value which equals to 4.080E-02, an value $X^2Y$ which equals to −6.067E-06, a $Y^3$ value which equals to −8.948E-06, an $X^4$ value which equals to 1.866E-05, an $X^2 \times Y^2$ value which equals to 4.414E-05, and a $Y^4$ value which equals to 1.982E-05.

Freeform optic 20 can be made of glass, comprise glass, comprise a plastic material, or the like. Freeform optic 20 can be 3D-printed, for example, from a plastic material. Materials that can be used for the freeform optic can more specifically include silica glass, fused silica glass, radiation-hardened glass, borosilicate glass, polycarbonate, photo resin plastic, impurity-free fused silica glass, coated glass or plastic, or the like. One or more anti-reflective coatings, heat rejection coatings, or the like, can be provided on the freeform optic. The glass material can be made of fused silica having a thickness of 7.900 mm with a tolerance of 0.32 mm. The RMS surface figure error can be less than 50 nm and the RMS surface roughness can be less than 5 nm. The X width on the aperture dimension can have a value of 18 mm and a tolerance of 0.1 mm. The Y width on the aperture dimension can have a value of 10 mm and a tolerance of 0.1 mm.

Referring to both FIGS. 1 and 2, incoming radiation, for example, light beams 36, 38, and 40, impinge front surface 22 of freeform optic 20, are refracted through the optic, and exit back surface 24 focused on an image or focal plane 44, such as, or aligned with, a receptive surface of a detector. The detector can comprise a camera, a complementary metal-oxide-semiconductor (CMOS), one or more photomultipliers, an array of photomultipliers, silicon photomultipliers (SiPMs), a combination thereof, or the like. In the example illustrated, light beams 36, 38, and 40 are each generated by the same star.

By spectrally separating each of light beams 36, 38, and 40, the different wavelengths or colors of light impinge at different locations on image plane 44 and a receptive surface of the detector. Accordingly, a color-sensitive detector can be used, although mono-chromatic detectors can also, or instead, be used.

Figure 4:
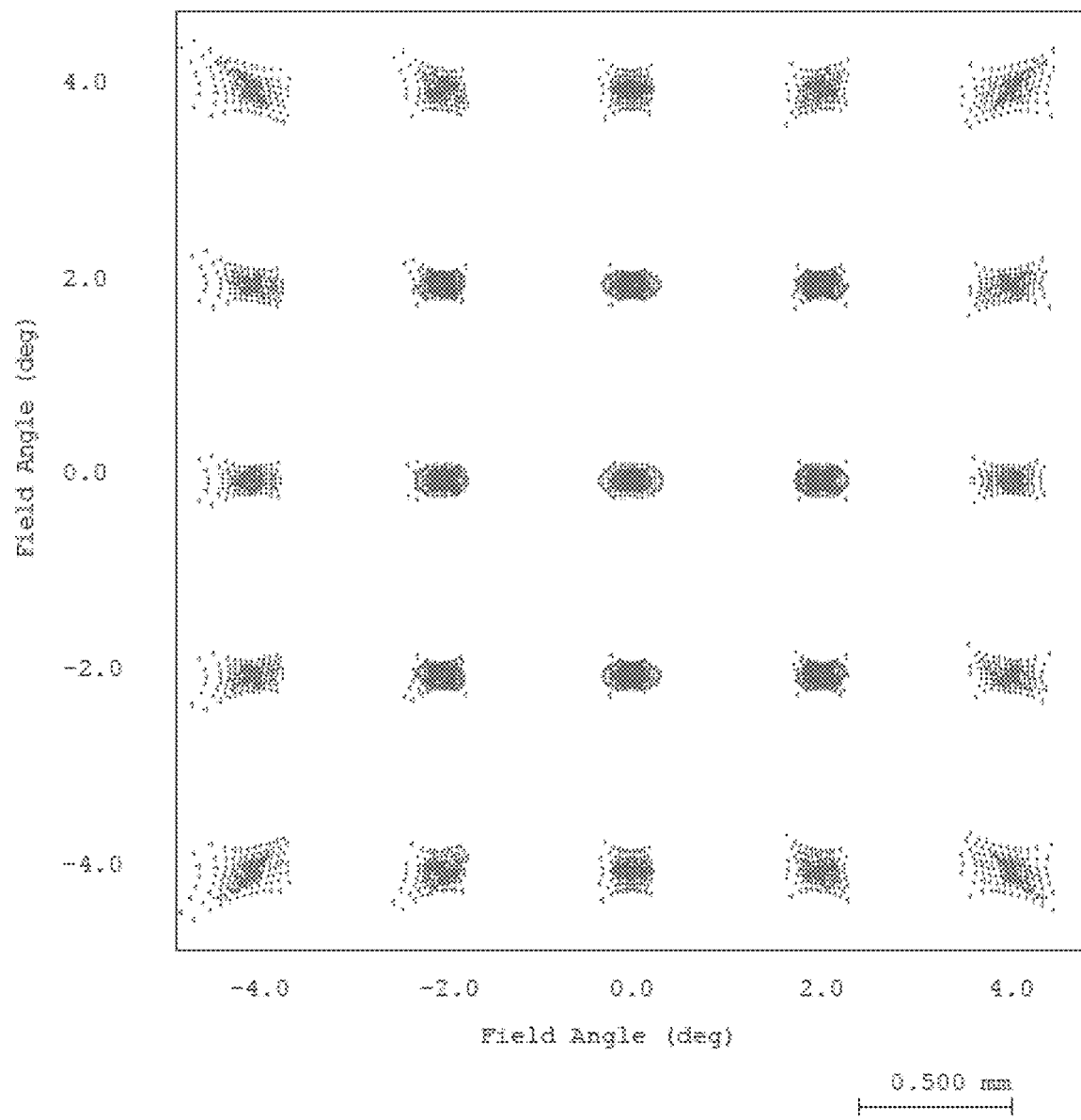
FIG. 4 is a 2-dimensional plot showing the relative amount of image distortion at coordinates corresponding to various pairs of field angle degrees in the X and Y directions, with respect to a dead center location.

FIG. 4 shows the relative image distortion that can be expected at different pixel locations at the receptive surface of the detector, relative to a dead-center location. The dead center location is at the 0° by 0° field angle position, relative to incoming, incident radiation. As can be seen from FIG. 4, good focus is achieved from the freeform optic at coordinate pairs of from negative 2.0 to 2.0 field angle deviations in the X direction, and at negative 2.0 to 2.0 field angle degree deviation in the Y direction.

Figure 5A:
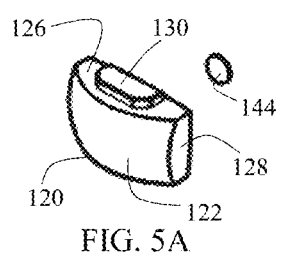
FIG. 5A is a top right front perspective view of a freeform optic in accordance with various embodiments of the present invention and showing an image or focal plane for alignment with a receptive surface of a detector onto which incident rays passing through the freeform optic are focused.

FIG. 5A is a top right front perspective view of a freeform optic 120, according to various embodiments of the present invention, arranged to focus incoming radiation on a receptive surface 144 of a detector. Freeform optic 120 is generally similar to freeform optic 20 shown in FIG. 1, and includes a front surface 122, a top surface 126, and a right surface 128. Freeform optic 120 also comprises a protrusion 130, protruding from top surface 126, provided for shouldering against a complimentary shoulder of an optic housing, so that freeform optic 120 can be accurately aligned with an image or focal plane 144, such as, or aligned with, a receptive surface of a detector.

Figure 5B:
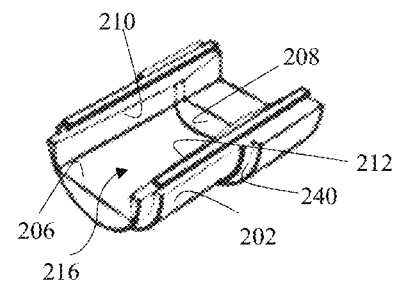
FIG. 5B is a top left front perspective view of a bottom portion of an optic housing designed to secure and align the freeform optic shown in FIG. 5A with the image plane and a receptive surface of a detector.

FIG. 5B is a top left front perspective view of a bottom portion 202 of an optic housing configured to house freeform optic 120 shown in FIG. 5A, and to align freeform optic 120 with image plane 144. Bottom portion 202 comprises a flat bottom interior surface 206 on which a flat bottom surface of freeform optic 120 can rest. Flat bottom interior surface 206 terminates at a shoulder 208 that further secures freeform optic 120 in housing bottom portion 202 and prevents freeform optic 120 from sliding out of bottom portion 202. Shoulder 208 contacts the back surface of freeform optic 120 when the optic is housed in bottom portion 202. Bottom portion 202 comprises sidewalls 210 and 212 that, together with bottom interior surface 206, define a channel 216 into which freeform optic 120 can slide during assembly, until freeform optic 120 rests against shoulder 208 to thereby be aligned within bottom portion 202.

Figure 5C:
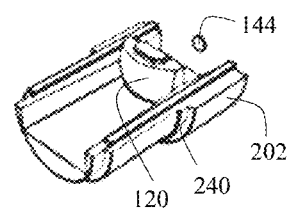
FIG. 5C shows the freeform optic of FIG. 5A housed in the housing bottom portion of FIG. 5B.

FIG. 5C, shows freeform optic 120 operatively arranged in bottom portion 202 and aligned with image plane 144. Outside shoulder 240 on bottom portion 202 can be used for aligning and securing bottom portion 202 within a CubeSat satellite, a modular satellite, another spacecraft, a modular component of a spacecraft, or the like.

Figure 5D:
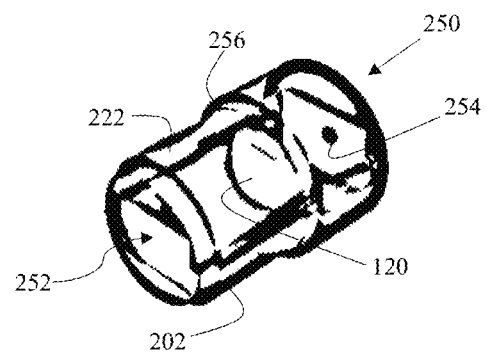
FIG. 5D shows the housed freeform optic of FIG. 5C in an assembled optic housing that includes a housing top portion that further secures and aligns the freeform optic.

FIG. 5D shows an assembled optic housing 250 including freeform optic 120 and bottom portion 202 as depicted in FIG. 5C, along with a housing top portion 222 connected to bottom portion 202 and fixing and aligning freeform optic 120 in the housing. Assembled optic housing 250 defines a front opening 252 through which incoming rays of radiation can impinge on freeform optic 120 and be focused thereby through a back opening 254 onto image or focal plane 144 where the focused rays can impinge on the receptive surface of a detector. Housing top portion 222 includes a top shoulder 256 that is continuous with shoulder 240 of housing bottom portion 202 to form an annular shoulder on assembled optic housing 250 to facilitate positioning and alignment of assembled optic housing 250 on a spacecraft and/or spacecraft module, and to operatively position assembled optic housing 250 with respect to a detector. One or more splines can be provided on either or both of housing bottom portion 202 and housing top portion 222 for the purpose of providing radial alignment of assembled optic housing 250 with respective to a module, a frame, or other spacecraft component.

Figure 6:
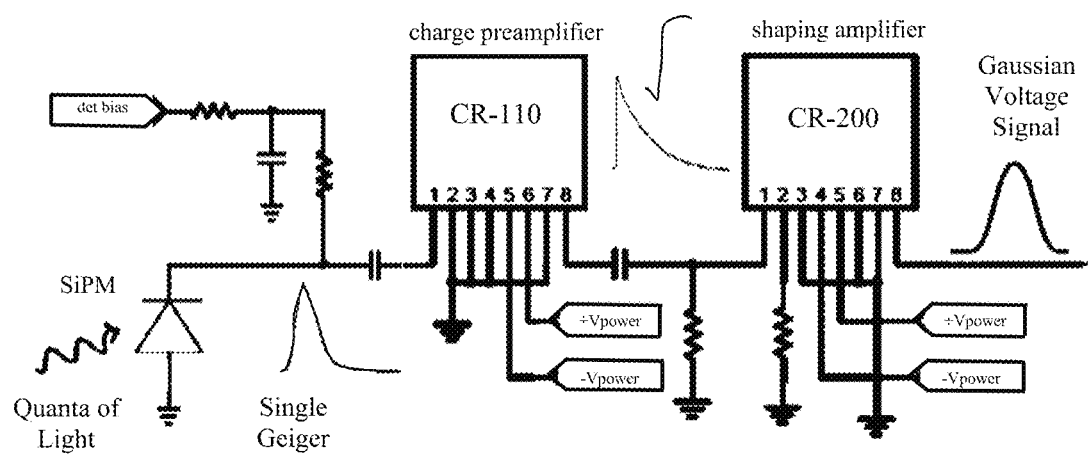
FIG. 6 shows an exemplary sensor board layout in the form of a detector and a charge sensitive amplifier option.

FIG. 6 is a circuit diagram of an exemplary sensor board layout showing electronic parts that have been carefully selected to satisfy the high through-put data and high voltage requirements needed to operate detectors comprising Silicon photomultiplier (SiPMs) components. The circuit layout shown in FIG. 6 enables the star scanner to be extremely flexible and useful in many different CubeSat designs and mission types. Central to the front-end sensor board layout is a charge sensitive preamplifier (CSP) CR-110 and a shaping amplifier CR-200. Charge sensitive preamplifier CR-110 can be, for example, a CR-110 charge sensitive preamplifier available from Cremat Inc of West Newton, Mass., such as a CR-110 rev. 2 charge sensitive preamplifier, a CR-11X charge sensitive preamplifier, or the like. The charge sensitive preamplifier can include a small, eight-pin, single in-line package (SIP), epoxy-coated, single-channel circuit that is less than or equal to about 1 square inch in size.

The shaping amplifier can comprise a CR-200-1 µs rev. 2 amplifier, also available from Cremat Inc, or a similar CR-200-X shaping module. The shaping amplifier can be used to transform the shape of pulses produced by the charge sensitive preamplifier to make the pulses gaussian-shaped (bell-shaped), to improve single-to-noise, and to provide gain for the signals. The shaping amplifier can comprise an eight-pin, single in-line package (SIP), epoxy-coated, single-channel circuit that is less than or equal to about 1 square inch in size. Any suitable shaping time can be provided by the shaping amplifier, for example, from 100 ns to 2 microseconds (µs), or 1 µs.

After shaping with shaping amplifier CR-200, the gaussian-shaped voltage signal can then be sent to an analog-to-digital converter (ADC) for converting the analog signals to a digital code that can then be sent to a digital signal processor (DSP). For example, a DSP can be configured to detect unique photon events and can be mounted on a board that is no more than 100 cm$^2$ in area, for example, having a length of about 10 cm and a width of about 10 cm.

Figure 7:
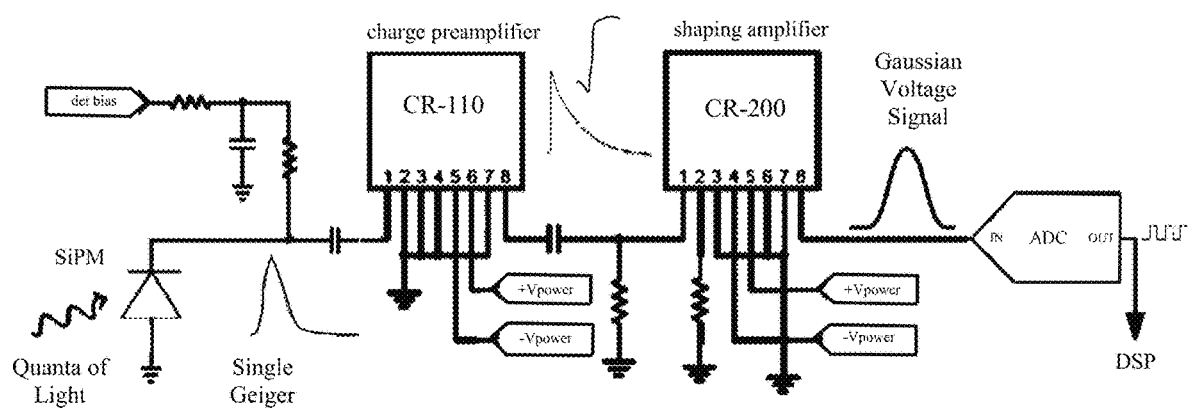
FIG. 7 shows an exemplary sensor board layout in the form a detector, charge sensitive amplifier, and an analog-to-digital converter option.

FIG. 7 depicts another front-end sensor board layout, similar to that shown in FIG. 6, but that also includes, as part of the sensor board, an ADC built into the sensor board. Digital code generated by the ADC can be sent to a digital signal processor, as described in FIG. 6, for example, having an area of 100 cm$^2$ or less. The DSP can run a signal-processing algorithm, for example, as developed by NASA for small satellites. The DSP can also be configured to run attitude algorithms, star identification algorithms, orbit determination algorithms, attitude output telemetry algorithms, and the like, all on the same DSP card.

Figure 8:
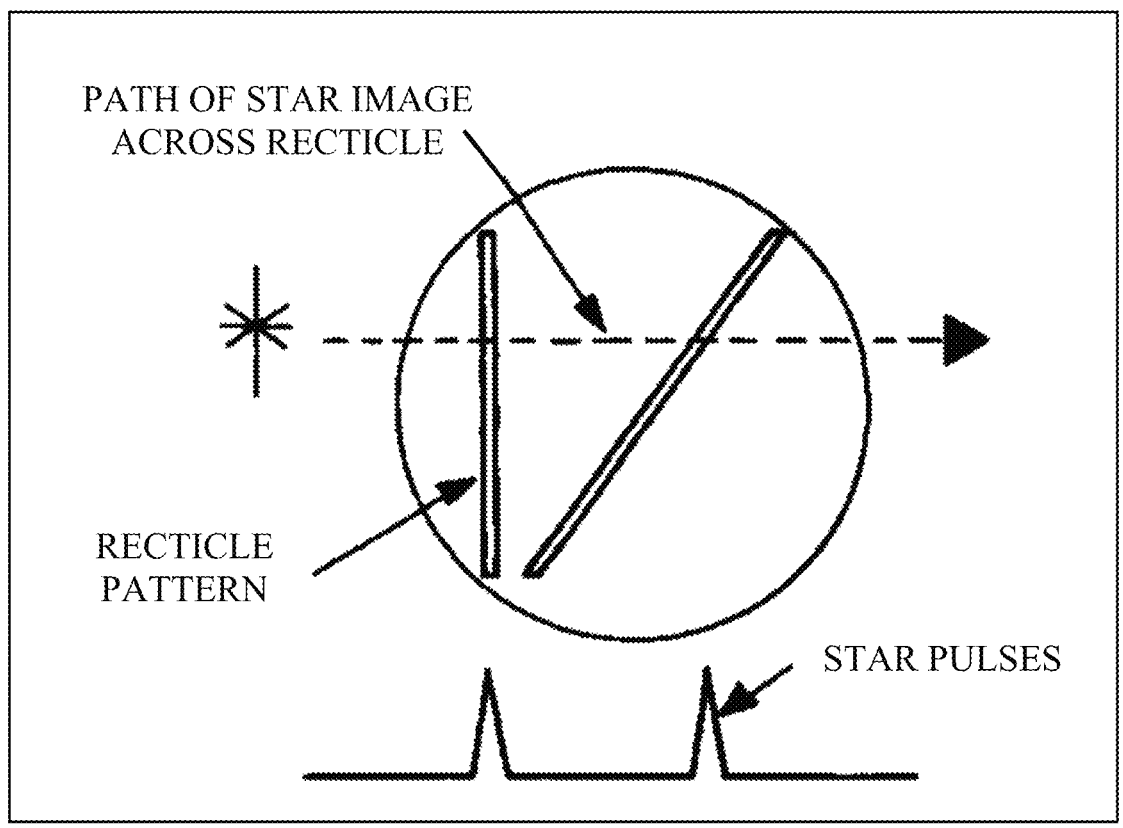
FIG. 8 is a schematic diagram showing an exemplary V-slit reticle that can be used in the star scanner, according to various embodiments of the present invention, and showing the incident radiation star pulses that can be detected using such a reticle.

FIG. 8 shows an exemplary V-slit reticle that can be used in the star scanner and shows the path of a star image that, through relative motion, would move across the reticle and emit radiation through the silts of the reticle and onto the receptive surface or focal plane of the detector. At the bottom of FIG. 8 the amount of incoming radiation passing through the slits is schematically shown as two-star pulses, each corresponding to the relative time frame during which the path of the star image is aligned with the respective slit. The V-slit reticle size, slit lengths, and angle can be adjusted to optimize directing the star image signal into the sensor electronics, based, for example, on flat optics properties and detector properties. Star pulse signatures can be generated and compared to a star catalog determined from night sky sensitivity tests to create various simulations, such as Monte Carlo simulations. The simulations can be used to understand the limitations of the sensor performance from an attitude determination (pointing knowledge) perspective. Star pulse signatures can also be generated to create a star catalog.

Even though a V-silt reticle shape is depicted in FIG. 8, other non-traditional reticle and aperture shapes can instead or also be used, for example, that are well suited for CubeSat and SmallSat imaging applications. Although a high-aspect ratio aperture might be expected to normally cause a large amount of aberration and reduce image quality, the freeform optic makes-up for aberrations by dramatically improving image quality. By using a V-slit reticle or mask over a detector to determine spacecraft attitude, the star scanner can be uniquely appropriate for use with the freeform optic because good image resolution is only needed in one dimension.

A frame or chassis can be provided to align various components of the star scanner. For example, a frame can have mounted therein or thereon: the optic housing including the freeform optic; the reticle; the detector; and the electronics sensor board.

Figure 9:
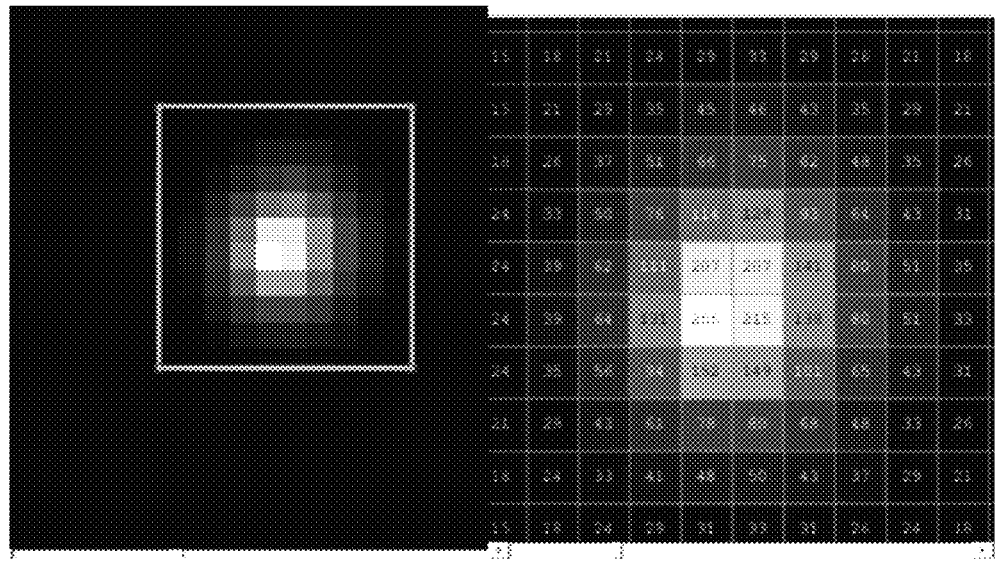
FIG. 9 is a two-part screenshot resulting from a radiometric study and depicting, in the left portion of the screenshot, a captured centroid achieved after light source intensity reduction carried out by signal processing the intensity signals received by the various pixels of the pixel array shown in the right portion of the screenshot.

FIG. 9 is a two-part screenshot from an exemplary radiometric study carried out using a star scanner with freeform optic according to an embodiment of the present invention. In the left portion of the screenshot a captured centroid is shown indicating the presence of a star. The image results from light source intensity reduction, signal processing carried out on the pixelated intensity values detected by the two-dimensional array of pixels shown in the right portion of the screenshot.

Figure 10:
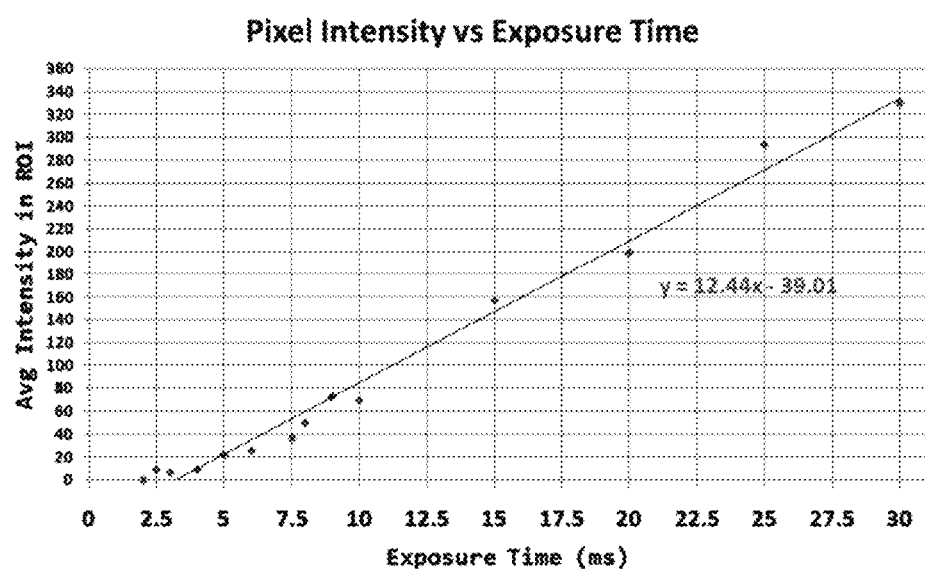
FIG. 10 is a graph of pixel intensity versus exposure time that can be used as a prediction of command-able exposure times with IDS back-illuminated CMOS COTS hardware.

FIG. 10 is a graph of pixel intensity versus exposure time measured in milliseconds (ms) and shows data points plotted and used to extrapolate the line shown. The line graphed can be useful for predicating command-able exposure times for use with Imaging Development Systems (IDS) back-illuminated CMOS commercially available off-the-shelf (COTS) hardware.

Figure 11:
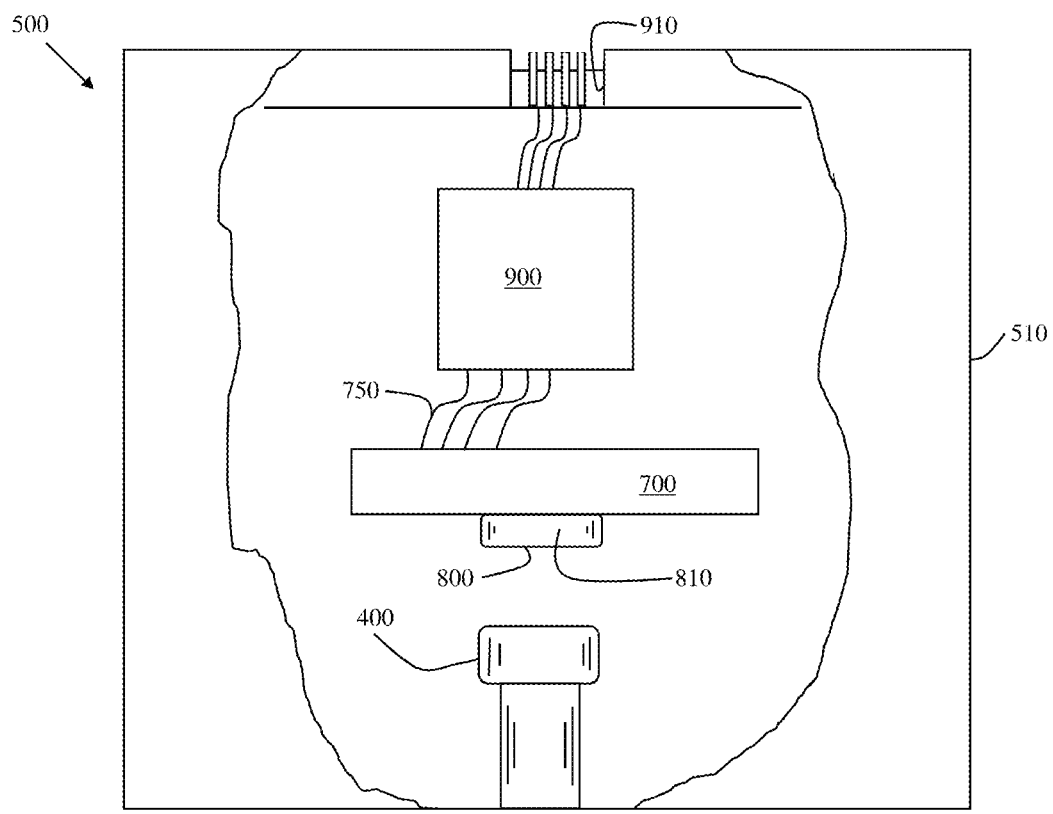
FIG. 11 is a top view of a star scanner module, in partial cutaway, in accordance with the present invention.

FIG. 11 is a top view, in partial cut-away, of a star scanner module 500 in accordance with the present invention. Star scanner module 500 comprises a frame 510 holding an optics housing 400 that is similar to the optics housing described above in connection with FIGS. 5A-5D. An electronics sensor board 700 is mounted on module frame 510 and includes a camera 810 and a reticle 800 through which light focused by optics housing 400 can pass to impinge electronics sensor board 700. A wire harness 750 can electronically connect electronics sensor board 700 to a microprocessor 900. Microprocessor 900 can be connected, through wires, to a pin and socket connector 910 at the rear of star scanner module 500. Pin and socket connector 910 can be used to connect star scanner module to a spacecraft, for example, a spacecraft having a complementary pin and socket connector in the back of a receiving module slot.

Figure 12:
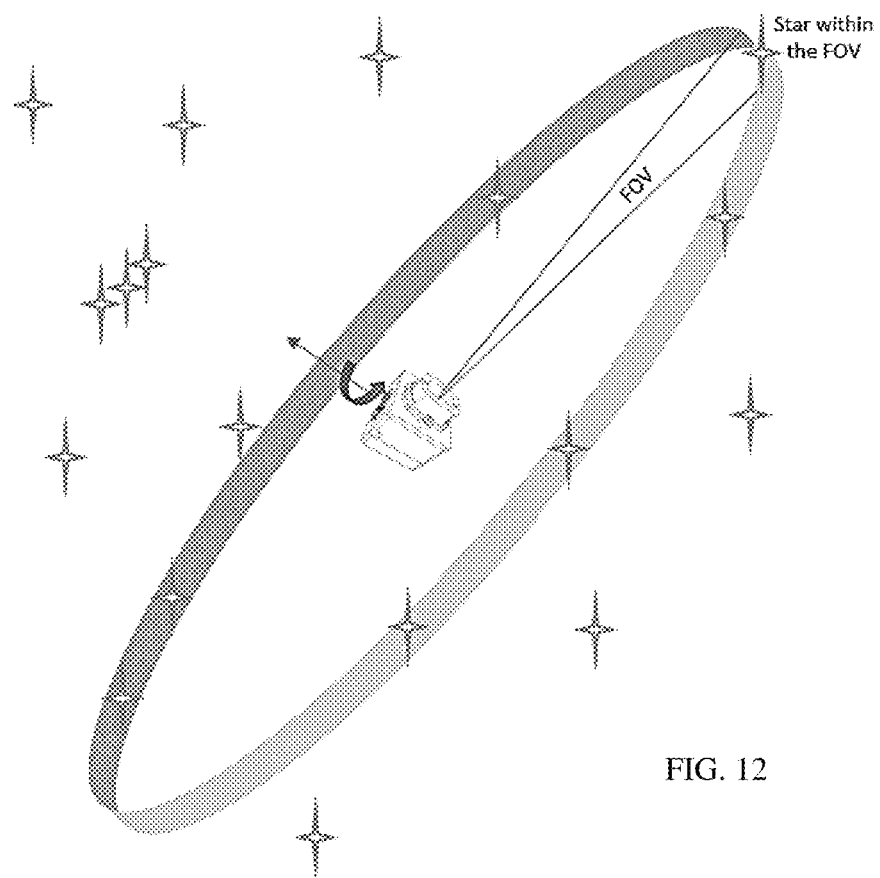
FIG. 12 is a schematic view of a rotating star scanner of the present invention, depicting a star in the star scanner field of view (FOV).

FIG. 12 is a schematic view of a rotating star scanner of the present invention, depicting a star in the star scanner field of view (FOV).

Figure 13:
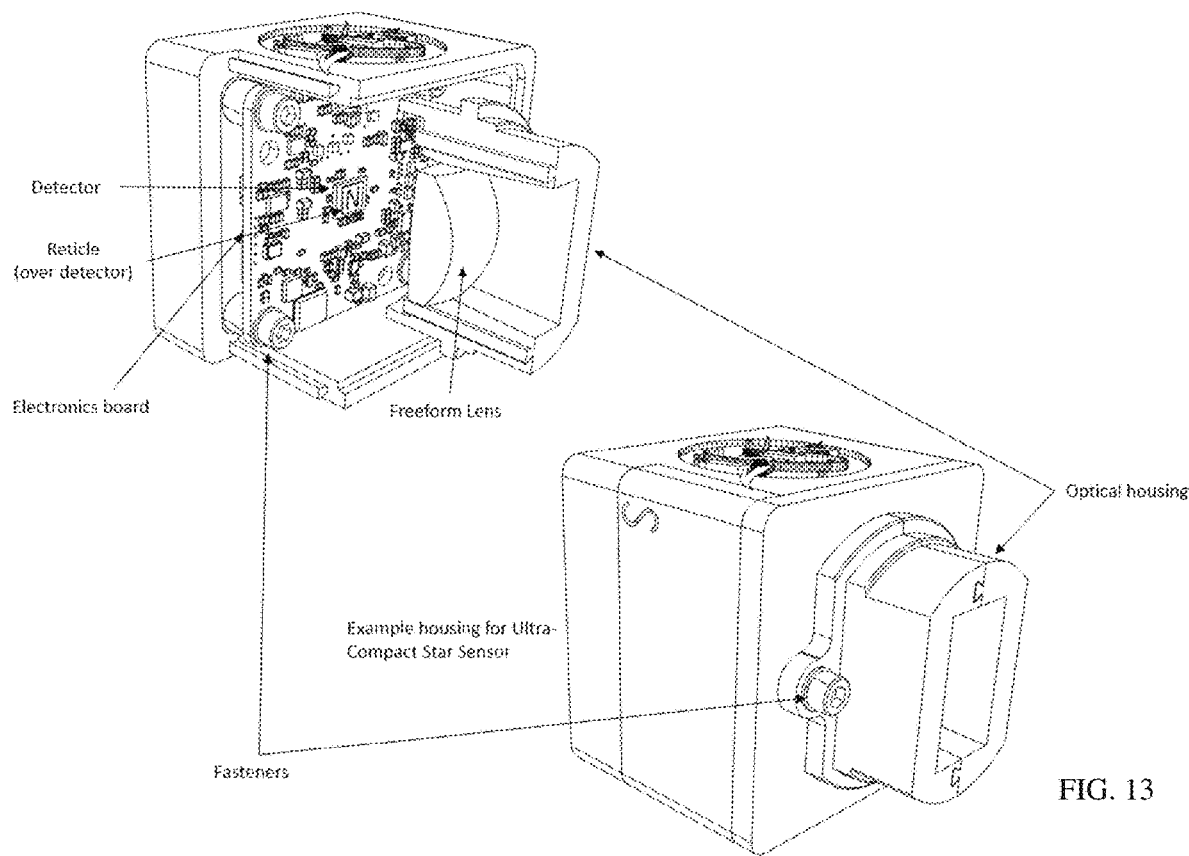
FIG. 13 is a composite drawing showing a top, left, front perspective view of a star scanner of the present invention assembled and in partial break-away.

FIG. 13 is a composite drawing showing a top, left, front perspective view of a star scanner of the present invention assembled and in partial break-away.

A computer program run on a local or remote computer or processor can be used to control and adjust the star scanner. A user can enter commands in the computer program by using an onboard or remote input device such as keyboard, touchscreen, joystick, a combination thereof, or the like. The star scanner can be incorporated into an autonomous control system. The user or control system can first enter a Star-Tracker Control Menu. Exemplary control menu general purpose commands that can be entered include:

| 1 | Init | Initialize camera with parameters |
|---|---|---|
| 2 | XY_Pixel_Values | Display camera XY info |

From the StarTracker Control Menu, other commands and functions that can be carried out include:

| 3 | Ueye Camera Manger | Display Camera Controls |
|---|---|---|
| 4 | IDS Camera Manager | Display Camera Controls |
| 5 | View Pixel Values | View Pixel Values |
| 6 | View Image | View Image |
| 7 | View XY_Pixel_Values | View Pixel Values |
| 99 | Exit | |

The controller or computer can prompt the user to "select a command: _," and can provide a field to type in a corresponding command number, acronym, code, or other instruction.

The entire contents of all references cited in this disclosure are incorporated herein in their entireties, by reference. Herein, the term "about" means within a range of from plus 5% to minus 5% the value modified. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A modular star scanner assembly comprising:
    a freeform optic having;
        a convex front surface having a first radius of curvature, from left to right;
        a convex back surface having a second radius of curvature, from left to right, wherein the second radius of curvature is greater than the first radius of curvature;
        a planar right surface;
        a planar left surface that is parallel to the planar right surface;
        a planar top surface; and
        a planar bottom surface that is parallel to the planar top surface;
    an optic housing configured to secure the freeform optic therein, said optic housing including a front opening through which incoming beams of radiation can enter the optic housing and reach the freeform optic and a back opening through which beams of radiation can exit the housing, wherein said freeform optic being aligned within said optic housing such that the freeform optic can focus incoming beams of radiation after the beams pass through the optic and exit the back opening of the optic housing;
    a detector including a receptive surface with the detector being aligned with the optic housing such that incoming beams of radiation pass through the front opening and are refracted by the freeform optic to form focused beams of radiation, exit the back opening, and impinge upon the receptive surface of the detector;
    a V-slit aperture aligned with the optic housing and positioned between the back opening of the optic housing and the receptive surface of the detector; and
    a module frame, the module frame holding the V-slit aperture, the optical component, and the detector, aligned with one another;
    an electronic sensor board mounted within the module frame: the electronic sensor board comprising electrical leads for receiving signals generated by the detector, a charge sensitive amplifier, a shaping amplifier, and an analog-to-digital convertor; and
    a digital signal processor mounted within the module frame in electrical communication with, and configured to receive digital signals from, the analog-to-digital convertor, wherein the digital signal processor has a maximum area of 100 cm2 or less; and
    wherein said modular star scanner assembly being adapted to removably engage a modular slot in a spacecraft as a single assembly to facilitate swapping with existing spacecraft modular components.

2. The star scanner of claim 1, wherein the charge sensitive amplifier has a maximum area of 1 square inch or less and the shaping amplifier has a maximum area of 1 square inch or less.

3. A spacecraft in combination with the modular star scanner assembly of claim 1, and the star scanner being mounted in the spacecraft such that the module frame is received within the module slot.

4. A system comprising the modular star scanner assembly of claim 1, an analytical instrument module, and a spacecraft, wherein
    the analytical instrument is different than the modular star scanner assembly, comprises an instrument module frame of about the same overall dimensions as the modular star scanner assembly module frame, and is configured to carry out one or more analyses from the spacecraft,
    the spacecraft comprises said module slot configured to accommodate and mount a plurality of different modular components including, independently, each of the analytical instrument and the modular star scanner assembly,
    the module slot is configured to receive the instrument module frame or the modular star scanner assembly module frame, one at a time, and
    the system is configured to enable swapping of the star scanner and the analytical instrument.

5. A system comprising two or more spacecrafts and the modular star scanner assembly of claim 1, wherein each of the spacecrafts comprises a respective module slot configured to receive the module frame, and wherein the star scantier is configured to be (1) inserted into the module slot of a first of the two or more spacecrafts, (2) removed therefrom, and (3) subsequently inserted into the module slot of a second of the two or more spacecrafts.

6. The assembly of claim 1, wherein the freeform optic has a width, measured from the left surface to the right surface, of one inch or less.

7. The assembly of claim 6 wherein the freeform optic has a height, from the top surface to the bottom surface, that is less than the width.

8. The assembly of claim 7 wherein the top surface of the freeform optic comprises a protrusion extending therefrom, and a top shoulder along a sidewall of the protrusion and extending from an intersection of the protrusion and the top surface.

9. The assembly of claim 1 wherein the free form freeform optic is formed from a 3D-printed plastic material.

10. The assembly of claim 1 wherein the optic housing has a first housing portion having a first circumference, a second housing portion having a second circumference that is greater than the first circumference, and a shoulder formed at an intersection of the first housing portion and the second housing portion.

11. The star scanner of claim 1, wherein the receptive surface comprises an array of pixels.

12. The star scanner of claim 1, wherein the detector comprises silicon photomultipliers.

\* \* \* \* \*